(12) United States Patent
Kudo et al.

(10) Patent No.: US 12,106,874 B2
(45) Date of Patent: Oct. 1, 2024

(54) WIRING MEMBER

(71) Applicant: Sumitomo Wiring Systems, Ltd., Mie (JP)

(72) Inventors: Ryusuke Kudo, Mie (JP); Tetsuya Nishimura, Mie (JP); Haruka Nakano, Mie (JP); Masaki Mizushita, Mie (JP); Kenta Arai, Mie (JP)

(73) Assignee: Sumitomo Wiring Systems, Ltd., Mie (JP)

( * ) Notice: Subject to any disclaimer, the term of this patent is extended or adjusted under 35 U.S.C. 154(b) by 137 days.

(21) Appl. No.: 17/774,350

(22) PCT Filed: Oct. 28, 2020

(86) PCT No.: PCT/JP2020/040380
§ 371 (c)(1),
(2) Date: May 4, 2022

(87) PCT Pub. No.: WO2021/095524
PCT Pub. Date: May 20, 2021

(65) Prior Publication Data
US 2022/0406488 A1    Dec. 22, 2022

(30) Foreign Application Priority Data
Nov. 14, 2019   (JP) .................. 2019-206173

(51) Int. Cl.
*H01B 7/08* (2006.01)
*B60R 16/02* (2006.01)

(52) U.S. Cl.
CPC .......... *H01B 7/0838* (2013.01); *B60R 16/02* (2013.01); *H01B 7/0823* (2013.01)

(58) Field of Classification Search
CPC ..... B60R 16/02; B60R 16/0215; F16B 13/02; F16B 5/06; H01B 7/0823; H01B 7/0838; H02G 3/0406; H02G 3/32
See application file for complete search history.

(56) References Cited

U.S. PATENT DOCUMENTS 1,822,056 A * 9/1931 Noble .................... H02G 3/065
285/179
4,836,580 A * 6/1989 Farrell ................ F16L 25/0045
285/133.11

(Continued)

FOREIGN PATENT DOCUMENTS

CN          1745501        3/2006
CN        102575797        7/2012

(Continued)

OTHER PUBLICATIONS

Japan Office Action issued in Japan Patent Application No. 2019-206173, dated Mar. 28, 2023, together with English translation thereof.

(Continued)

*Primary Examiner* — William H. Mayo, III
*Assistant Examiner* — Rhadames Alonzo Miller
(74) *Attorney, Agent, or Firm* — Greenblum & Bernstein, P.L.C.

(57) ABSTRACT

A wiring member includes: a wire-like transmission member; a first sheet to which the wire-like transmission member is fixed; and a second sheet, at least a part of which is overlapped with the first sheet, wherein a first through hole is formed in one of the first sheet and the second sheet, a second through hole formed to be continuous with the first through hole and smaller than the first through hole is formed in another one of the first sheet and the second sheet.

7 Claims, 5 Drawing Sheets

(56) References Cited

U.S. PATENT DOCUMENTS

| | | | | |
|---|---|---|---|---|
| 5,029,908 A | * | 7/1991 | Belisaire | F16L 37/0982 285/323 |
| 5,803,512 A | * | 9/1998 | Hollnagel | F16L 37/084 285/424 |
| 6,199,920 B1 | * | 3/2001 | Neustadtl | F16L 37/0985 285/903 |
| 7,201,382 B2 | * | 4/2007 | Viegener | F16L 37/0845 277/611 |
| 7,316,429 B2 | * | 1/2008 | Viegener | F16L 37/091 285/307 |
| 7,481,462 B2 | * | 1/2009 | Arning | F16L 5/027 285/414 |
| 7,587,924 B2 | * | 9/2009 | Viegener | F16L 13/142 285/382.4 |
| 7,980,600 B2 | * | 7/2011 | Hofmann | F16L 37/138 285/322 |
| 8,025,315 B2 | * | 9/2011 | Schreckenberg | F16L 37/091 285/248 |
| 8,262,138 B2 | * | 9/2012 | Rischen | F16L 13/146 285/323 |
| 8,480,134 B2 | * | 7/2013 | Crompton | F16L 37/0915 29/521 |
| 8,517,431 B2 | * | 8/2013 | Arning | B21C 37/28 285/256 |
| 9,249,907 B2 | * | 2/2016 | Mester | F16L 13/142 |
| 2003/0038481 A1 | * | 2/2003 | Viegener | F16L 13/142 285/104 |
| 2004/0154819 A1 | * | 8/2004 | Sakata | B60R 16/0222 174/650 |
| 2009/0235521 A1 | * | 9/2009 | Suzuki | H01B 13/0129 29/825 |
| 2011/0049875 A1 | * | 3/2011 | Stults | F16L 13/142 285/345 |
| 2012/0137494 A1 | | 6/2012 | Deterre et al. | |
| 2012/0161438 A1 | * | 6/2012 | Rischen | F16L 13/142 285/382 |
| 2012/0325553 A1 | * | 12/2012 | Ito | H01R 43/24 174/70 R |
| 2013/0284484 A1 | * | 10/2013 | Toyama | B60R 16/0215 174/68.3 |
| 2015/0000974 A1 | * | 1/2015 | Shiga | H02G 3/22 174/72 A |
| 2015/0354738 A1 | * | 12/2015 | Morse | H02G 15/013 285/39 |
| 2016/0191721 A1 | | 6/2016 | Ozawa | |
| 2016/0307670 A1 | * | 10/2016 | Makino | B29C 45/14467 |
| 2017/0356576 A1 | * | 12/2017 | Shemtov | H02G 3/06 |
| 2019/0067922 A1 | * | 2/2019 | Platt | F16L 13/142 |
| 2019/0288494 A1 | * | 9/2019 | Morse | H02G 3/0481 |
| 2020/0070749 A1 | | 3/2020 | Mizuno et al. | |
| 2020/0248853 A1 | * | 8/2020 | Kimura | H02G 9/10 |

FOREIGN PATENT DOCUMENTS

| | | |
|---|---|---|
| CN | 105743034 | 7/2016 |
| JP | 9-162571 | 6/1997 |
| JP | 2002-151867 | 5/2002 |
| JP | 2002-305832 | 10/2002 |
| JP | 2003-023723 | 1/2003 |
| JP | 2003-133655 | 5/2003 |
| JP | 2012-099301 | 5/2012 |
| JP | 2012099301 A * | 5/2012 |
| JP | 2018-190696 | 11/2018 |
| JP | 6531884 | 6/2019 |
| JP | 2020-010455 | 1/2020 |

OTHER PUBLICATIONS

International Search Report issued in International Patent Application No. PCT/JP2020/040380, dated Dec. 8, 2020, along with an English translation thereof.

International Preliminary Report on Patentability issued in International Patent Application No. PCT/JP2020/040380, dated May 27, 2022, along with an English translation thereof.

U.S. Appl. No. 17/774,299 to Ryusuke Kudo et al., filed May 4, 2022.

China Office Action issued in China Patent Application No. 202080078088.2, dated Mar. 1, 2024, together with English translation thereof.

* cited by examiner

WIRING MEMBER

TECHNICAL FIELD

The present disclosure relates to a wiring member.

BACKGROUND ART

Patent Document 1 discloses that a wiring body in which an electrical wire is fixed to a sheet-like member is fixed to a fixing target member via an adhesive part.

PRIOR ART DOCUMENTS

Patent Documents

Patent Document 1: Japanese Patent Application Laid-Open No. 2018-190696

SUMMARY

Problem to be Solved by the Invention

Considered herein is that a through hole is formed in the wiring body. When the wiring body includes a laminated structure made up of a first sheet and a second sheet, it is considered that the first sheet and the second sheet are overlapped with each other after the through hole is separately formed in the first sheet and the second sheet.

However, in this case, there is a possibility that positions of the through holes deviate from each other. When the positions of the through holes deviate from each other, there may be a case where a size of the through hole formed in the wiring body gets small unexpectedly.

Accordingly, an object of the present disclosure is to be able to suppress unexpected reduction in a size of a through hole in a case where a first sheet and a second sheet are overlapped with each other and the through hole is formed in a wiring member.

Means to Solve the Problem

A wiring member according to the present disclosure is a wiring member including: a wire-like transmission member; a first sheet to which the wire-like transmission member is fixed; and a second sheet, at least a part of which is overlapped with the first sheet, wherein a first through hole is formed in one of the first sheet and the second sheet, a second through hole is formed in another one of the first sheet and the second sheet, the second through hole is formed to be continuous with the first through hole, and the second through hole is smaller than the first through hole.

Effects of the Invention

According to the present disclosure, suppressed is unexpected reduction in a size of the through hole in a case where the first sheet and the second sheet are overlapped with each other and the through hole is formed in the wiring member.

DESCRIPTION OF EMBODIMENT(S)

Description of Embodiment of Present Disclosure

Figure 1:
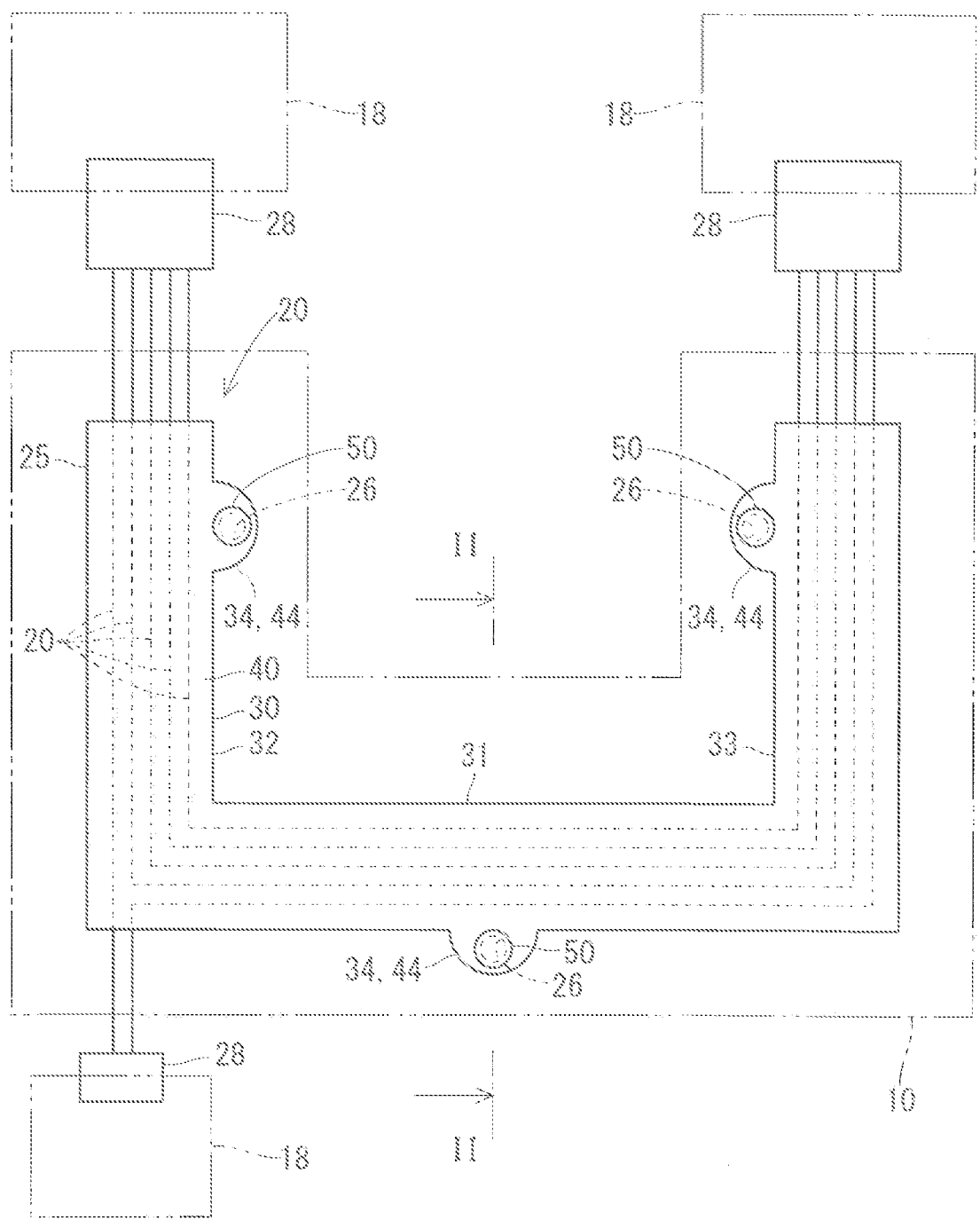
FIG. 1 is a plan view illustrating a wiring member according to an embodiment.

Embodiments of the present disclosure are listed and described firstly.

A wiring member according to the present disclosure is as follows.

(1) A wiring member includes: a wire-like transmission member; a first sheet to which the wire-like transmission member is fixed; and a second sheet, at least a part of which is overlapped with the first sheet, wherein a first through hole is formed in one of the first sheet and the second sheet, a second through hole is formed in another one of the first sheet and the second sheet, the second through hole is formed to be continuous with the first through hole, and the second through hole is smaller than the first through hole.

According to this wiring member, the second through hole is smaller than the first through hole. Thus, even if a position of the first through hole and a position of the second through hole deviate from each other at a time of overlapping the first sheet with the second sheet, an opening of the small second through hole is hardly covered by the sheet in which the first through hole is formed. As a result, suppressed is unexpected reduction in a size of the through hole in a case where the first sheet and the second sheet are overlapped with each other and the through hole is formed in the wiring member.

(2) In the wiring member according to (1), one of the first sheet and the second sheet is a rigid sheet having higher rigidity than another one of the first sheet and the second sheet, the another one of the first sheet and the second sheet is a flexible sheet having lower rigidity than the one of the first sheet and the second sheet, the second through hole is formed in the rigid sheet, and the first through hole is formed in the flexible sheet. In this case, the smaller second through hole formed in the rigid sheet can define an innermost peripheral edge of a through hole formed in the wiring member. Thus, a shape of the through hole formed in the wiring member is hardly lost (3) In the wiring member according to (1) or (2), the first through hole is formed in a side closer to a fixing target member in the first sheet and the second sheet, and the second through hole is formed in a side farther away from a fixing target member in the first sheet and the second sheet. An opening edge defined by the large first through hole is hidden by one of the first sheet and the second sheet located farther away from the fixing target member.

(4) In the wiring member according to any one of (1) to (3), the first through hole and the second through hole are formed into a similarity shape. In this case, the first through hole and the second through hole have the similarity shape, thus suppressed is unexpected reduction in the size of the through hole formed in the wiring member even if the first through hole and the second through hole deviate in any direction.

(5) The wiring member according to any one of (1) to (4) further includes a vehicle fixing component which can be fixed to a fixing target member in a vehicle, and the vehicle fixing component is held in the first sheet and the second sheet while being inserted into the first through hole and the second through hole. In this case, the vehicle fixing component is held in the first sheet and the second sheet. The vehicle fixing component is fixed to the fixing target member to fix the wiring member to the fixing target member.

(6) In the wiring member according to any one of (1) to (5), the first through hole and the second through hole may be provided in positions away from the wire-like transmission member.

(7) It is also applicable that in the wiring member according to any one of (1) to (6), the first sheet includes a first protruding piece protruding to a lateral side with respect to a portion where the wire-like transmission member is fixed, the second sheet includes a second protruding piece overlapped with the first protruding piece, the first through hole is formed in the first protruding piece, and the second through hole is formed in the second protruding piece. In this case, a part of the wiring member other than a portion where the protruding piece is formed can be formed to have a small width. The part of the wiring member other than the portion where the protruding piece is formed is formed to have a small width, thus the fixing target member can be visually recognized at a time of fixing a vehicle fixing component to the fixing target member. Thus, an operation of fixing the vehicle fixing component to the fixing target member can be easily performed.

DETAILS OF EMBODIMENT OF PRESENT DISCLOSURE

Specific examples of a wiring member of the present disclosure are described hereinafter with reference to the drawings. The present disclosure is not limited to these examples, but is indicated by claims, and it is intended that meanings equivalent to claims and all modifications within a scope of claims are included.

EMBODIMENT

Figure 2:
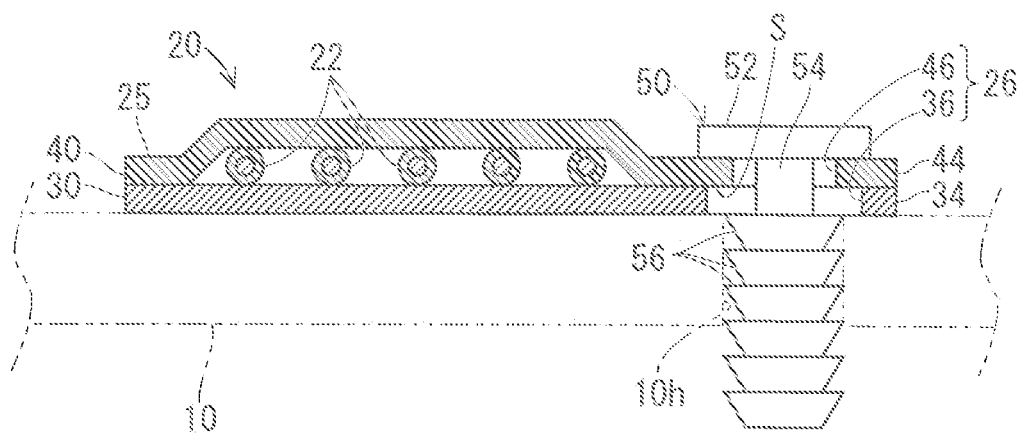
FIG. 2 is a II-II line cross-sectional view in FIG. 1.

A wiring member according to an embodiment is described hereinafter. FIG. 1 is a plan view illustrating a wiring member 20 according to the embodiment. FIG. 2 is a II-II line cross-sectional view in FIG. 1. In FIG. 1 and FIG. 2, the fixing target member 10 to which the wiring member 20 is fixed is indicated by a virtual line.

The wiring member 20 includes a wire-like transmission member 22, a first sheet 30, and a second sheet 40.

The wire-like transmission member 22 is assumed to be a wire-like transmission member connecting components in a vehicle. A wiring member 20 includes the plurality of wire-like transmission members 22. The wire-like transmission members 22 are branched in accordance with positions of component to which the plurality of wire-like transmission members 22 are connected, and extend along a wiring route in a vehicle.

More specifically, the wire-like transmission member 22 may be a wire-like member transmitting an electrical power or light, for example. For example, the wire-like transmission member 22 may be a general wire having a core wire and a covering around the core wire, or may also be a bare wire, a shielded wire, a twisted wire, an enamel wire, a nichrome wire, or an optical fiber.

The wire-like transmission member 22 transmitting the electrical power may be various kinds of signal lines or various kinds of power lines. Some of the wire-like transmission members transmitting the electrical power may be used as an antenna or coil, for example, transmitting or receiving a signal or electrical power to or from a space.

The wire-like transmission member 22 may be a single wire-like object or a composite object of a plurality of wire-like objects (a twisted wire and a cable made up of a plurality of wire-like objects covered by a sheath).

Description herein is based on an assumption that the wire-like transmission member 22 is an electrical wire 22.

The first sheet 30 is a sheet-like member to which the electrical wire 22 is fixed. The first sheet 30 is formed into an elongated sheet-like shape extending along a wiring route. Herein, the first sheet 30 includes an intermediate portion 31, one end portion 32, and the other end portion 33. Each of the intermediate portion 31 and the end portion 32 and 33 is formed into an elongated band-like shape. One end portion 32 extends from one end portion of the intermediate portion 31 in a direction intersecting with an extension direction of the intermediate portion 31 (herein, a direction perpendicular to the extension direction thereof). The other end portion 33 extends from the other end portion of the intermediate portion 31 in a direction intersecting with an extension direction of the intermediate portion 31 (herein, a direction perpendicular to the extension direction thereof). Herein, the direction in which one end portion 32 and the other end portion 33 extend from the intermediate portion 31 is the same.

The first sheet 30 may be linearly formed, or may also be bended in various directions. The first sheet 30 may have a portion bended to have a curved shape. The first sheet 30 may have a branched portion.

Applicable as the fixing state of fixing the electrical wire 22 to the first sheet 30 are a contact area fixation and a non-contact area fixation, or both fixations may be used together. Herein, the contact area fixation indicates that a portion where the electrical wire 22 and the first sheet 30 have contact with each other is stuck and fixed. The non-contact area fixation indicates the fixing state which is not the contact area fixation. The non-contact area fixation indicates that a fixing member such as a sewing thread, the other sheet material, or an adhesive tape, for example, presses the electrical wire 22 toward the first sheet 30 or sandwiches the electrical wire 22 and the first sheet 30 to keep them in a fixing state. In the description hereinafter, the electrical wire 22 and the first sheet 30 are in the state of the contact area fixation.

Applicable as the configuration of the contact area fixation are a contact area indirect fixation and a contact area direct fixation, or both fixations may also be used together in different regions. Herein, the contact area indirect fixation indicates that the electrical wire 22 and the first sheet 30 are indirectly stuck and fixed via an adhesive agent, a gluing agent, and a double-sided adhesive tape provided therebetween. The contact area direct fixation indicates that the electrical wire 22 and the first sheet 30 are directly stuck and fixed without an intervention of the adhesive agent, for example, which is separately provided. Considered in the contact area direct fixation is that resin included in at least one of the electrical wire 22 and the first sheet 30 is melted, thus the electrical wire 22 and the first sheet 30 are stuck and fixed, for example.

In forming the state of such a contact area direct fixation, the resin is considered to be melted by heat or a solvent, for example. That is to say, the state of the contact area direct fixation may be the state of the contact area direct fixation by the heat or the state of the contact area direct fixation by the solvent. The contact area direct fixation by the heat is preferable.

At this time, a means of forming the state of the contact area direct fixation is not particularly limited, but a known means such as welding, fusion, and melting joint can be used. For example, when the state of the contact area direct fixation by the heat is formed by welding, various welding means such as ultrasonic welding, heating-pressurizing welding, hot air welding, and high frequency welding can be adopted. When the state of the contact area direct fixation is formed by these means, the electrical wire 22 and the first sheet are in the state of the contact area direct fixation by these means. Specifically, when the state of the contact area direct fixation is formed by the ultrasonic welding, for example, the electrical wire 22 and the first sheet 30 are in the state of the contact area direct fixation by the ultrasonic welding.

In the description hereinafter, the electrical wire 22 and the first sheet 30 are in the state of the contact area direct fixation.

Herein, the plurality of electrical wires 22 are fixed to one main surface of the first sheet 30 to parallelly extend along the extension direction of the first sheet 30. The plurality of electrical wires 22 extend from an end portion of the first sheet 30 to an outer side, and are connected to a connector 28. The plurality of electrical wires 22 may not extend from the end portion of the first sheet 30. For example, it is also applicable that a connector is fixed to the end portion of the first sheet 30 and the plurality of electrical wires 22 do not extend from the first sheet 30 but are connected to the connector.

Some of the electrical wires 22 in the plurality of electrical wires 22 may be branched from the other electrical wires 22 in an intermediate portion of the first sheet 30 in the extension direction to extend from a lateral side of the first sheet 30 to an outer side. Herein, some of the electrical wires 22 are branched from the other electrical wires 22 between the intermediate portion 31 and the end portion 32 to extend to an outer side. The connector 28 is connected also to end portions of some branched electrical wires 22.

The electrical wire 22 is connected to a component 18 (an electrical component 18 herein) in a vehicle via the connector 28. The electrical wire 22 may be directly connected to the electrical component 18 without an intervention of the connector 28.

The second sheet 40 is a sheet, at least a part of which is overlapped with the first sheet 30. Herein, the second sheet 40 is formed into the same shape as the first sheet 30, and is overlapped with a whole of the first sheet 30. The second sheet 40 may be overlapped with a part of the first sheet 30 in the extension direction. The second sheet 40 may be overlapped with a part of the first sheet 30 in a width direction. A part of the second sheet 40 may protrude from the first sheet 30.

The second sheet 40 may be overlapped with a surface of the first sheet 30 on a side which the electrical wire 22 is fixed or may also be overlapped with a surface thereof on a side which the electrical wire 22 is not fixed. The second sheet 40 may also be overlapped with both surfaces of the first sheet 30.

When the second sheet 40 is overlapped with the surface of the first sheet 30 on a side which the electrical wire 22 is fixed, the second sheet 40 can have a function of protecting the electrical wire 22. The second sheet 40 can have a function of making the wiring member 20 be hardly bended. When the second sheet 40 is overlapped with the first sheet 30 on a side opposite to a side which the electrical wire 22 is fixed, the second sheet 40 can have a function of reinforcing the first sheet 30 from a back side and making the electrical wire 22 be hardly bended as a whole. The second sheet 40 may be overlapped with the first sheet 30 only in a region where a through hole 26 described hereinafter is formed. It is not necessary that the second sheet 40 has the functions described above. Described herein is an example that the second sheet 40 is overlapped with a surface of the first sheet 30 on a side which the electrical wire 22 is fixed. That is to say, the second sheet 40 is overlapped with the first sheet 30 while covering the electrical wire 22. The first sheet 30 and the second sheet 40 are mutually fixed on both outer sides of the electrical wire 22 fixed to the first sheet 30. These sheets may be fixed by welding, bonding, adhesion, or sewing, for example. The welding may be ultrasonic welding or thermal welding.

A material constituting the first sheet 30 and the second sheet 40 is not particularly limited. For example, the first sheet 30 and the second sheet 40 may be formed of resin such as polyvinyl chloride (PVC), polyethylene terephthalate (PET), polypropylene (PP), or nylon. The first sheet 30 and the second sheet 40 may be a fibrous material having fiber such as a non-woven cloth, a woven fabric, or a knitting fabric or a non-fiber material, for example. The non-fiber material may be a solid member with an inner portion evenly filled or a foam made up by foam molded resin. The first sheet 30 and the second sheet 40 may contain a material such as metal, for example.

In the present wiring member 20, the through hole 26 is formed in a laminated body 25 made up of the first sheet 30 and the second sheet 40. The through hole 26 is a hole passing through the laminated body 25 in a thickness direction. The through hole 26 is formed by connecting a through hole 36 formed in the first sheet 30 and a through hole 46 formed in the second sheet in the thickness direction of the laminated body 25 in a state where the first sheet 30 and the second sheet 40 are overlapped with each other. Described in the present embodiment is that the through hole 36 formed in the first sheet 30 is the first through hole 36, and the through hole 46 formed in the second sheet 40 is the second through hole 46 smaller than the first through hole 36. Herein, the state where the second through hole 46 is smaller than the first through hole 36 may also be considered a state where an opening area of the second through hole 46 in a plan view is smaller than that of the first through hole 36 in a plan view regardless of whether or not the first through hole 36 and the second through hole 46 have a similarity shape. The state where the second through hole 46 is smaller than the first through hole 36 may also be considered a state where the first through hole 36 and the second through hole 46 have a relationship that a whole opening region of the second through hole 46 can be disposed in an opening region of the first through hole 36.

The through hole 26 is formed in positions away from the electrical wire 22. Thus, both the first through hole 36 and the second through hole 46 are provided in positions away from the electrical wire 22. The configuration is not limited to the present embodiment, however, it is also applicable that a first through hole is formed in the second sheet and a second through hole smaller than the first through hole is formed in the first sheet.

Herein, the first through hole 36 and the second through hole 46 are formed into a similarity shape. More specifically, the first through hole 36 and the second through hole 46 are formed into a circular shape, and an outer diameter of the second through hole 46 is formed to be smaller than an inner diameter of the first through hole 36. As the other example, the first through hole and the second through hole may also be formed into oval shapes or polygonal shapes, respectively, so as to have a similarity shape with different sizes. It is not necessary that the first through hole and the second through hole have a similarity shape. For example, it is also applicable that one of the first through hole and the second through hole has a circular shape and the other one thereof has an oval shape.

The through hole 26 formed in the laminated body 25 is formed by continuously forming the first through hole 36 and the second through hole 46 smaller than the first through hole 36. Thus, an innermost peripheral edge of the through hole 26 is defined by an inner peripheral edge of the smaller second through hole 46. A level difference S may occur by a difference in size between the first through hole 36 and the second through hole 46 in an intermediate portion of the through hole 26 in a passing direction of the through hole 26. An inner peripheral edge of the first through hole 36 is disposed on an outer peripheral side of the second through hole 46 via the level difference S. Thus, a portion surrounding the second through hole 46 in the second sheet 40 can be reinforced by a part of the first sheet 30 where the first through hole 36 is formed.

It is assumed that a position of the first through hole 36 formed in the first sheet 30 is accurate as designed, a position of the second through hole 46 formed in the second sheet 40 is accurate as designed, and furthermore, the first sheet 30 and the second sheet 40 are overlapped with each other without a positional deviation. In this case, a center of the first through hole 36 and a center of the second through hole 46 have a positional relationship that the centers thereof coincide with each other. The inner peripheral edge of the first through hole 36 is concentrically disposed on an outer side of the inner peripheral edge of the second through hole 46.

In contrast, in the following case, the first through hole 36 and the second through hole 46 are disposed to deviate from each other. For example, one of a case where a position of the first through hole 36 in the first sheet 30 deviates from a design position, a case where a position of the second through hole 46 in the second sheet 40 deviates from a design position, and a case where the first sheet 30 and the second sheet 40 are overlapped to deviate from each other occurs.

Figure 3:
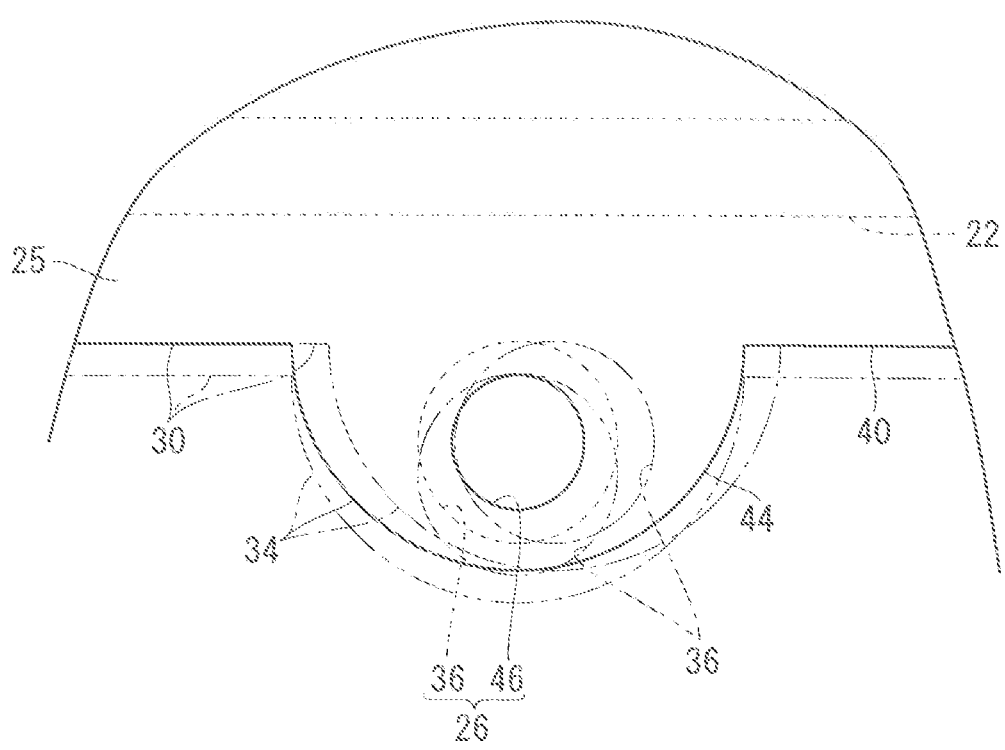
FIG. 3 is an explanation diagram illustrating a relationship between a first through hole and a second through hole.

When the second through hole 46 deviates from the first through hole 36 in an extension direction of the electrical wire 22, as illustrated by an alternate long and short dash line in FIG. 3, the second through hole 46 is located in a position closer to one side in relation to the first through hole 36 in the extension direction of the electrical wire 22. Even in this case, the first through hole 36 is larger than the second through hole 46, thus the second through hole 46 can be located within the first through hole 36. Thus, kept is a state where the innermost peripheral edge part of the through hole 26 is defined by the inner peripheral edge of the second through hole 46.

When the second through hole 46 deviates from the first through hole 36 along a direction perpendicular to the extension direction of the electrical wire 22, as illustrated by an alternate long and two short dashes line in FIG. 3, the second through hole 46 is located in a position closer to one side in relation to the first through hole 36 in the direction perpendicular to the extension direction of the electrical wire 22. Even in this case, the first through hole 36 is larger than the second through hole 46, thus the second through hole 46 can be located within the first through hole 36. Thus, kept is the state where the innermost peripheral edge part of the through hole 26 is defined by the inner peripheral edge of the second through hole 46.

The through hole 26 may be formed in any position in the laminated body 25 made up of the first sheet 30 and the second sheet 40.

Herein, a protruding piece (first protruding piece) 34 is formed in the first sheet 30. A protruding piece (second protruding piece) 44 is formed also in the second sheet 40. The protruding piece 34 and the protruding piece 44 are formed into the same shape in the same position to be mutually overlapped with each other. The first through hole 36 is formed in the protruding piece 34, and the second through hole 46 is formed in the protruding piece 44.

More specifically, as described above, the first sheet 30 includes the intermediate portion 31 and the end portions 32 and 33 extending along the route of the electrical wire 22. A part of the first sheet 30 where the intermediate portion 31 and the end portions 32 and 33 are connected to form a U-like shape in a band-like form is a band-like portion of the first sheet 30 to which the electrical wire 22 is fixed. The protruding piece 34 is formed to protrude to an outer side from any lateral portion of the band-like portion. A shape of the protruding piece 34 is not particularly limited. Herein, the protruding piece 34 is formed into a shape in which a tip end portion forms into an arch, more specifically, a semi-circular shape. The protruding piece 34 may be formed into polygonal shape or a triangular shape, for example.

The protruding piece 44 is formed in a position and a shape similar to those of the protruding piece 34 described above in the second sheet 40, and the protruding piece 44 and the protruding piece 34 are overlapped with each other. The protruding piece 44 and the protruding piece 34 may be or may not be fixed to each other.

It is also applicable that the protruding pieces 34 and 44 described above are omitted, and the first through hole 36 and the second through hole 46 are formed in an inner side of a linear side edge part of the band-like portion extending along the route of the electrical wire 22.

Herein, the plurality of through holes 26 include through holes alternately formed on both sides of the electrical wire 22. Herein, the plurality of (three in FIG. 3) through holes 26 are alternately formed on both sides of the electrical wire 22 along the extension direction of the electrical wire 22.

The protruding piece 34 and the protruding piece 44 are overlapped with each other, thus the first through hole 36 formed in the protruding piece 34 and the second through hole 46 formed in the protruding piece 44 are continuously disposed to constitute the through hole 26.

The through hole 26 may be used for any purpose or any intended use. For example, the through hole 26 may also be used for fixing the wiring member 20 to the fixing target member 10 or positioning the wiring member 20. The first through hole 36 and the second through hole 46 described above may also be formed in the same process at a time of cutting the first sheet 30 and the second sheet 40 into a predetermined shape.

Herein, the wiring member 20 includes a vehicle fixing component 50. The vehicle fixing component 50 is a component which can be fixed to the fixing target member 10 in a vehicle. Herein, a vehicle-side fixing hole 10h is formed in the fixing target member 10. The vehicle-side fixing hole 10h may be a circular hole or an oval hole. Herein, the fixing target member 10 includes a plate-like portion. The vehicle-side fixing hole 10h is a hole formed to pass through the plate-like portion from a front side to a back side. The vehicle fixing component 50 may be held in the first sheet 30 and the second sheet 40 while being inserted therein in a state before the wiring member 20 is fixed to the fixing target member 10.

More specifically, the vehicle fixing component 50 may be a component referred to as a clip or a clamp used for fixing various vehicle components such as a wire harness to a vehicle. Herein, the vehicle fixing component 50 is a component formed of integrally molded resin, for example. The vehicle fixing component 50 includes a head part 52, a columnar part 54, and a plurality of locking pieces 56. The columnar part 54 is formed into an elongated shape. The columnar part 54 may be formed into a cylindrical shape or a rectangular columnar shape. The head part 52 is formed in a base end portion of the columnar part 54. The head part 52 is formed into a shape extending more than the second through hole 46, and does not come out of the through hole 46 but can be caught in a peripheral edge part of the through hole 46 in the second sheet 40. The head part 52 may be larger or smaller than the first through hole 36. Herein, the head part 52 is formed into a circular plate-like shape. The head part 52 may be formed into a disc spring-like shape. Each of the plurality of locking pieces 56 are formed into a cone-shaped outer peripheral surface, in other words, a shape directed to a base end portion of the columnar part 54 with a decreasing distance to an outer peripheral side of the columnar part 54. An outer width of the locking piece 56 is larger than an inner diameter of the vehicle-side fixing hole 10h. Thus, the locking piece 56 can be caught in the vehicle-side fixing hole 10h formed in the fixing target member 10. The plurality of locking pieces 56 are formed to be arranged side by side at intervals along the longitudinal direction of the columnar part 54.

Then, when the vehicle fixing component 50 is inserted into the vehicle-side fixing hole 10h, outward inclined surfaces of the plurality of locking pieces 56 have contact with the peripheral edge part of the vehicle-side fixing hole 10h, and the locking pieces 56 can be elastically deformed to shrink to a side of the columnar part 54. When at least some of the plurality of locking pieces 56 come out of the vehicle-side fixing hole 10h, the locking pieces 56 are elastically restored to an original shape, thus can be caught in the peripheral edge part of the vehicle-side fixing hole 10h in a retaining state. Accordingly, the vehicle fixing component 50 is fixed to the fixing target member 10. The vehicle fixing component may have a configuration in which a pair of locking pieces are formed to extend to an outer side from a tip end portion toward a base end portion of the columnar part in addition to the above configuration.

The vehicle fixing component 50 is formed into a shape so that the vehicle fixing component 50 can be inserted into the through hole 26 to be held in the laminated body 25 and the head part 52 and the locking piece 56 are caught in the through hole 26. For example, the second through hole 46 is formed into a shape smaller than the head part 52. Accordingly, the head part 52 does not come out of the through hole 26 but can be caught in the peripheral edge part of the through hole 26. For example, the second through hole 46 is formed to be larger than the columnar part 54 described above. Accordingly, the columnar part 54 can be inserted into the through hole 26. The second through hole 46 is formed to be smaller than the locking piece 56. Accordingly, the locking piece 56 can be caught in the peripheral edge part of the through hole 46 while the columnar part 54 of the vehicle fixing component 50 is inserted into the through hole 26. The first through hole 36 may be larger or smaller than the locking piece 56. Accordingly, the vehicle fixing component 50 hardly comes out of the first sheet 30. For example, one of the first through hole 36 and the second through hole 46 may be formed to have the same diameter as the vehicle-side fixing hole 10h described above.

Figure 4:
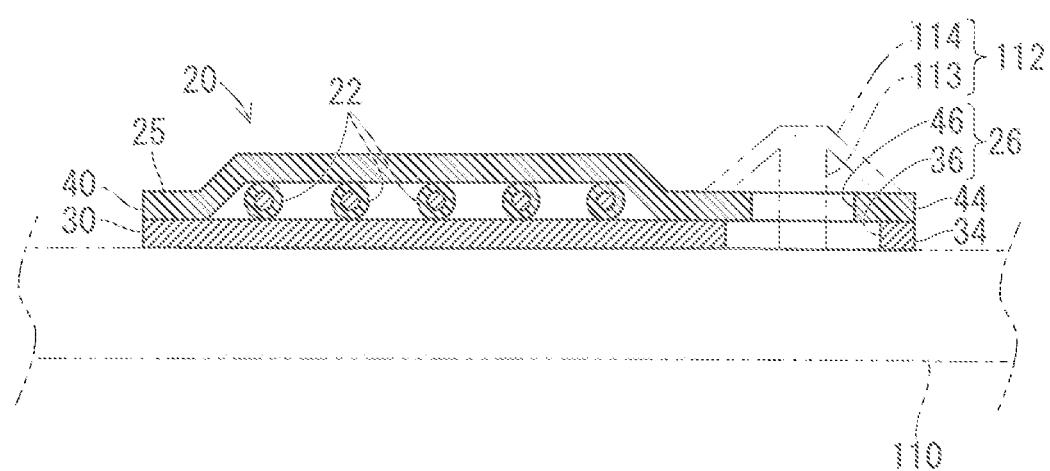
FIG. 4 is a cross-sectional view illustrating another example of a fixing structure of the wiring member.

It is not necessary that the vehicle fixing component 50 is held in the wiring member 20. It is not necessary that the wiring member 20 is fixed to the fixing target member 10 by the vehicle fixing component 50. For example, as with a modification example illustrated in FIG. 4, a fixation protruding part 112 may be formed in a fixing target member 110 corresponding to the fixing target member 10. The fixation protruding part 112 includes an elongated columnar part 113 protruding from a main surface of the fixing target member 10 and a pair of locking pieces 114 directed from a tip end portion toward a base end side of the columnar part 113, for example. It is also applicable that the fixation protruding prat 112 is inserted into the through hole 26 while the wiring member 20 is disposed on the fixing target member 10, and the pair of locking pieces 114 are caught in the peripheral edge part of the through hole 26 in the laminated body 25. The fixation protruding part may have a configuration similar to the columnar part 54 and the plurality of locking pieces 56 in the vehicle fixing component 50 described above. A pin for positioning provided to protruding on the fixing target member may be inserted into the through hole 26.

One of the first sheet 30 and the second sheet 40 is a rigid sheet having higher rigidity than the other one of the first sheet 30 and the second sheet 40, and the other one thereof is a flexible sheet having lower rigidity than the one thereof. Herein, the rigidity is a property regarding a degree of difficulty in deformation by external force. In this case, it is preferable that the smaller second through hole 46 is formed in the rigid sheet and the larger first through hole 36 is formed in the flexible sheet.

Herein, the second sheet 40 has higher rigidity than the first sheet 30. For example, the first sheet 30 may be soft enough to be able to be bended, particularly soft enough to be able to be folded. For example, the second sheet 40 may have rigidity high enough to allow the wiring member 20 to keep a constant wiring route as much as possible. A difference of rigidity between the first sheet 30 and the second sheet 40 can be achieved by one of a difference between the material constituting the first sheet 30 and the material constituting the second sheet 40, a difference between an outer shape of the first sheet 30 and an outer shape of the second sheet 40, and a difference of an inner shape of the first sheet 30 and an inner shape of the second sheet 40 or a combination thereof. For example, it is applicable that the material constituting the second sheet 40 is harder than the material constituting the first sheet 30, thus the second sheet 40 is formed to have higher rigidity than the first sheet 30. More specifically, the first sheet 30 may be mainly formed of soft polyvinyl chloride (PVC), and the second sheet 40 may be mainly formed of hard PVC. For example, it is applicable that a thickness of the second sheet 40 is larger than a thickness of the first sheet 30, thus the second sheet 40 is formed to have higher rigidity than the first sheet 30. For example, it is applicable that the first sheet 30 is a non-woven sheet, and the second sheet 40 is a sheet with an inner portion evenly filled, thus the second sheet 40 is formed to have higher rigidity than the first sheet 30. Furthermore, it is applicable that the first sheet 30 is a stacked sheet made up of a non-woven sheet and a soft PVC sheet, and the second sheet 40 is a hard PVC sheet, thus the second sheet 40 is formed to have higher rigidity than the first sheet 30.

When the smaller second through hole 46 is formed in the second sheet 40 having high rigidity, a portion for fixation to the fixing target member 10 such as, for example, the head part 52 of the vehicle fixing component 50 can firmly press the peripheral edge part of the second through hole 46 in the second sheet 40. Thus, the wiring member 20 is firmly fixed to the fixing target member 10.

The first sheet may have higher rigidity than the second sheet. In this case, it is also applicable that the smaller second through hole is formed in the first sheet and the larger first through hole is formed in the second sheet.

When there is a distance relationship between the fixing target member 10 and the first sheet 30 and between the fixing target member 10 and the second sheet 40, it is also applicable that the larger first through hole 36 is formed in one of the first sheet 30 and the second sheet 40 closer to the fixing target member 10 and the smaller second through hole 46 is formed in the farther one thereof.

Herein, the first sheet 30 is located on a side of the fixing target member 10 and the second sheet 40 is located on a side away from the fixing target member 10 in the state where the wiring member 20 is disposed on the main surface of the fixing target member 10. In this case, the head part 52 of the vehicle fixing component 50, for example, presses the wiring member 20 from a side away from the main surface of the fixing target member 10 toward the main surface thereof. Thus, when the smaller second through hole 46 is formed in the second sheet 40 on the side farther away from the fixing target member 10 in the first sheet 30 and the second sheet 40, the head part 52 of the vehicle fixing component 50, for example, can be caught in a portion surrounding the second through hole 46 more reliably. Accordingly, the vehicle fixing component 50 presses the first sheet 30 against the side of the fixing target member 10 via the second sheet 40, and the wiring member 20 is fixed to the fixing target member 10 more reliably.

The larger first through hole 36 is hidden by the second sheet 40 in which the second through hole 46 is formed.

According to the wiring member 20 having such a configuration, the second through hole 46 is smaller than the first through hole 36. Thus, even if the position of the first through hole 36 and the position of the second through hole 46 deviate from each other at the time of overlapping the first sheet 30 with the second sheet 40, an opening of the smaller second through hole 46 is not covered by the second sheet 40 in which the larger first through hole 36 is formed, and is kept open easily. As a result, a size of the through hole 26 is defined by the smaller second through hole 46 in the case where the first sheet 30 and the second sheet 40 are overlapped with each other and the through hole 26 is formed in the wiring member 20, and unexpected reduction in the size thereof is suppressed.

The smaller second through hole 46 formed in the second sheet 40 as the rigid sheet can define the innermost peripheral edge of the through hole 26. Thus, the shape of the through hole 26 is hardly lost. Thus, the wiring member 20 is firmly fixed to the fixing target member 10 using the vehicle fixing component 50, for example.

The larger second through hole 46 is formed in the first sheet 30 on the side closer to the fixing target member 10, and the smaller first through hole 36 is formed in the second sheet 40 on the side farther away from the fixing target member 10. Thus, a part of the opening of the larger first through hole 36 is hidden by the second sheet 40 in which the smaller second through hole 46 is formed. The second sheet 40 on the side farther away from the fixing target member 10 can be pressed against the fixing target member 10 by the vehicle fixing component 50, thus the wiring member 20 is firmly fixed to the fixing target member 10.

The first through hole 36 and the second through hole 46 have the similarity shape, thus suppressed is unexpected reduction in the size of the through hole 26 formed in the wiring member 20 even if the first through hole 36 and the second through hole 46 deviate in any direction.

When the vehicle fixing component 50 is inserted into the through hole 26 in the wiring member 20 and the vehicle fixing component 50 is held in the first sheet 30 and the second sheet 40, the wiring member 20 is easily fixed to the fixing target member 10 by the vehicle fixing component 50.

A part of the wiring member 20 other than a portion where the protruding pieces 34 and 44 are formed can be formed to have a small width. Accordingly, the fixing target member 10 (particularly, the vehicle-side fixing hole 10*h*) can be visually recognized easily at the time of fixing the vehicle fixing component 50 to the fixing target member 10. Thus, an operation of fixing the vehicle fixing component 50 to the fixing target member 10 can be easily performed.

MODIFICATION EXAMPLE

Figure 5:
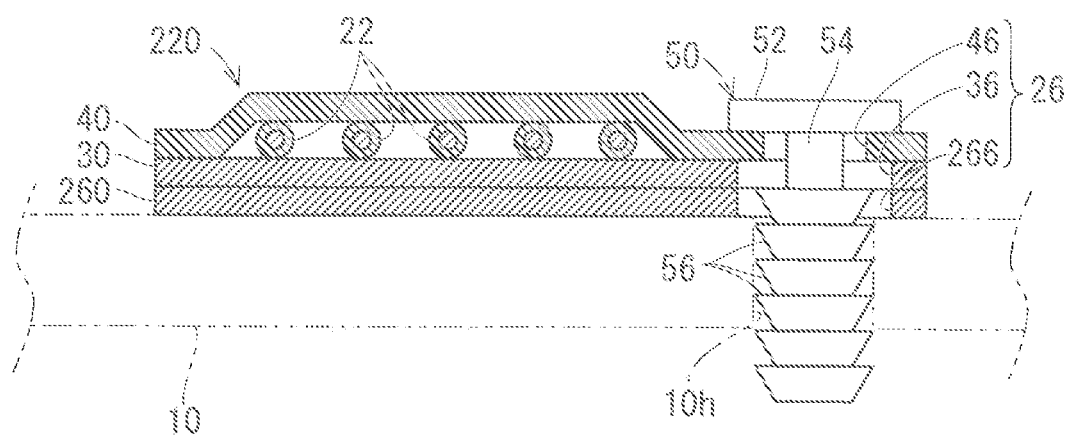
FIG. 5 is a cross-sectional view illustrating an example of providing a back side cover on the wiring member.

As illustrated in FIG. 5, a wiring member 220 corresponding to the wiring member 20 may further include the other sheet. Herein, the wiring member 220 has a configuration that a back-side cover 260 is added to the wiring member 20 in the embodiment described above. The back-side cover 260 is overlapped on an opposite side of the first sheet 30 from the electrical wire 22. The back-side cover 260 is fixed to the first sheet 30 by welding, bonding, adhesion, or sewing, for example. A fixing region where the back-side cover 260 is fixed to the first sheet 30 may be a whole or a part of the back-side cover 260. The back-side cover 260 may be wholly or partially overlapped with the first sheet 30.

The back-side cover 260 may have higher or lower rigidity than the first sheet 30, or may also have the same rigidity as the first sheet 30. Herein, the back-side cover 260 has higher rigidity than the first sheet 30. For example, the back-side cover 260 may be formed of a sheet material made up of the same material and having the same thickness as the second sheet 40.

A third through hole 266 is formed in a part of the back-side cover 260 corresponding to the first through hole 36. The third through hole 266 is continuously formed with the first through hole 36 on a side opposite to the second through hole 46. A through hole 226 made up of the third through hole 266, the first through hole 36, and the second through hole 46 continuously formed is formed in the wiring member 220.

The third through hole 266 may have the same size as the second through hole 46 or may be larger than the second through hole 46. Described herein is an example that the third through hole 266 is larger than the second through hole 46. Herein, the third through hole 266 is formed to have the same size as the first through hole 36. Thus, even if the first through hole 36 and the third through hole 266 deviate from the second through hole 46, unexpected reduction in the size of the through hole 226 is suppressed.

Each configuration described in the embodiment and each modification example can be appropriately combined as long as they are not contradictory.

EXPLANATION OF REFERENCE SIGNS 10 fixing target member
10*h* vehicle-side fixing hole 18 electrical component
20 wiring member
22 wire-like transmission member (electrical wire)
25 laminated body
26 through hole
28 connector
30 first sheet
31 intermediate portion
32, 33 end portion
34 protruding piece
36 first through hole
40 second sheet
44 protruding piece
46 second through hole
50 vehicle fixing component
52 head part
54 columnar part
56 locking piece
110 fixing target member
112 fixation protruding part
113 columnar part
114 locking piece
220 wiring member
226 through hole
260 back-side cover
266 third through hole
S level difference

The invention claimed is:

1. A wiring member, comprising:
a wire-like transmission member;
a first sheet to which the wire-like transmission member is fixed; and
a second sheet, at least a part of which is overlapped with the first sheet, wherein
a first through hole is formed in one of the first sheet and the second sheet,
a second through hole is formed in another one of the first sheet and the second sheet,
the second through hole is formed to be continuous with the first through hole, and the second through hole is smaller than the first through hole,
one of the first sheet and the second sheet is a rigid sheet having higher rigidity than another one of the first sheet and the second sheet, the another one of the first sheet and the second sheet is a flexible sheet having lower rigidity than the one of the first sheet and the second sheet, and
the second through hole is formed in the rigid sheet, and the first through hole is formed in the flexible sheet.

2. The wiring member according to claim 1, wherein
the first through hole is formed in a side closer to a fixing target member in the first sheet and the second sheet, and
the second through hole is formed in a side farther away from a fixing target member in the first sheet and the second sheet.

3. The wiring member according to claim 1, wherein
the first through hole and the second through hole are provided in positions away from the wire-like transmission member.

4. A wiring member, comprising:
a wire-like transmission member;
a first sheet to which the wire-like transmission member is fixed; and
a second sheet, at least a part of which is overlapped with the first sheet, wherein
a first through hole is formed in one of the first sheet and the second sheet,
a second through hole is formed in another one of the first sheet and the second sheet,
the second through hole is formed to be continuous with the first through hole, and the second through hole is smaller than the first through hole, and
the first through hole and the second through hole are formed into a similarity shape.

5. The wiring member according to claim 4, wherein
one of the first sheet and the second sheet is a rigid sheet having higher rigidity than another one of the first sheet and the second sheet, the another one of the first sheet and the second sheet is a flexible sheet having lower rigidity than the one of the first sheet and the second sheet, and
the second through hole is formed in the rigid sheet, and the first through hole is formed in the flexible sheet.

6. A wiring member, comprising:
a wire-like transmission member;
a first sheet to which the wire-like transmission member is fixed;
a second sheet, at least a part of which is overlapped with the first sheet; and
a vehicle fixing component which can be fixed to a fixing target member in a vehicle, wherein
a first through hole is formed in one of the first sheet and the second sheet,
a second through hole is formed in another one of the first sheet and the second sheet,
the second through hole is formed to be continuous with the first through hole, and the second through hole is smaller than the first through hole, and
the vehicle fixing component is held in the first sheet and the second sheet while being inserted into the first through hole and the second through hole.

7. A wiring member, comprising:
a wire-like transmission member;
a first sheet to which the wire-like transmission member is fixed; and
a second sheet, at least a part of which is overlapped with the first sheet, wherein
a first through hole is formed in one of the first sheet and the second sheet,
a second through hole is formed in another one of the first sheet and the second sheet,
the second through hole is formed to be continuous with the first through hole, and the second through hole is smaller than the first through hole,
the first sheet includes a first protruding piece protruding to a lateral side with respect to a portion where the wire-like transmission member is fixed,
the second sheet includes a second protruding piece overlapped with the first protruding piece,
the first through hole is formed in the first protruding piece, and
the second through hole is formed in the second protruding piece.

* * * * *